Jan. 23, 1968  S. LEOPOLD  3,364,933
SLIDABLE SURGICAL CLAMP
Filed March 29, 1965  2 Sheets-Sheet 1
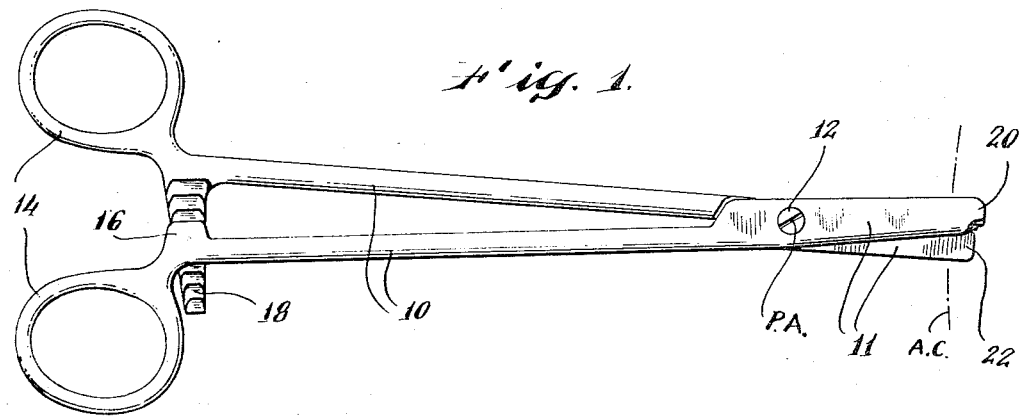
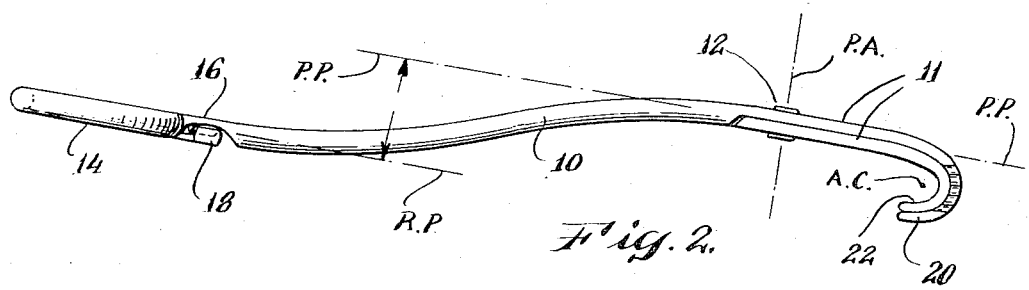
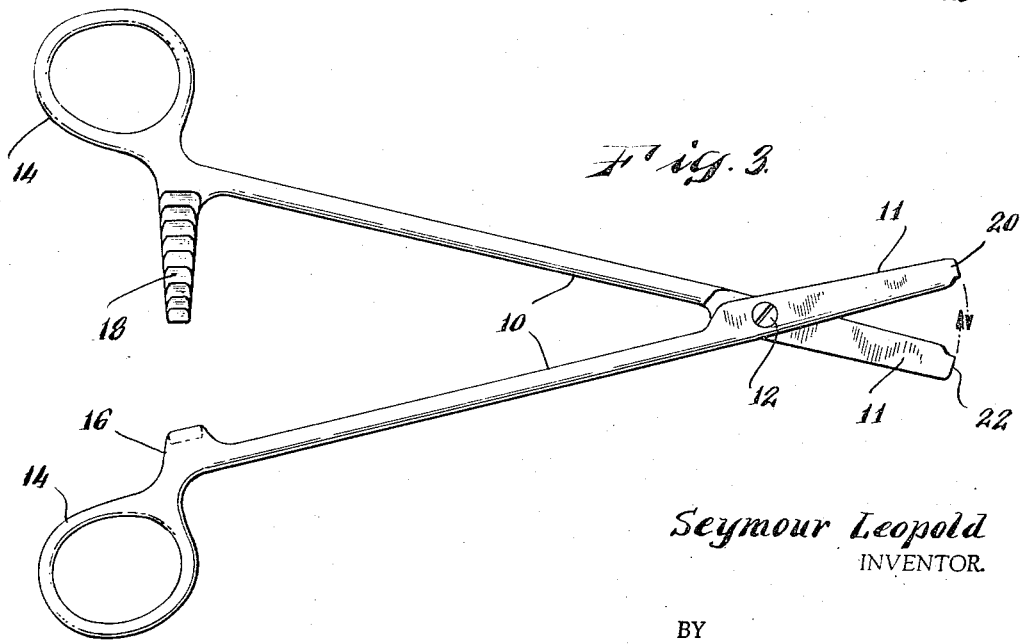
Seymour Leopold
INVENTOR.
BY Robert H. Ware
ATTORNEY.

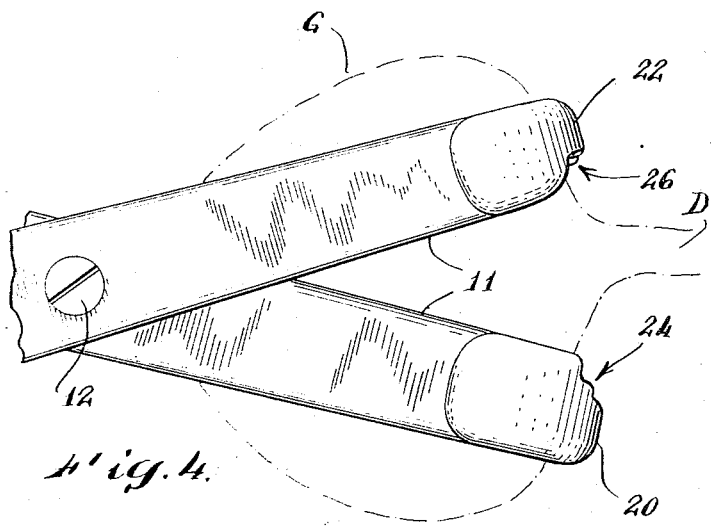
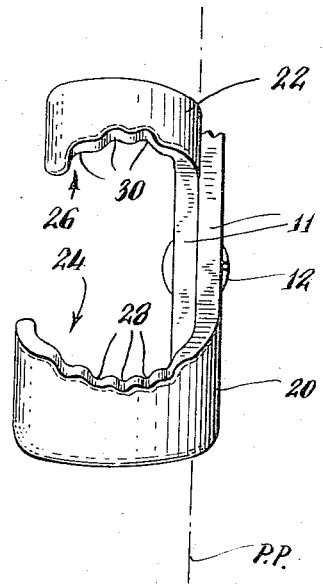
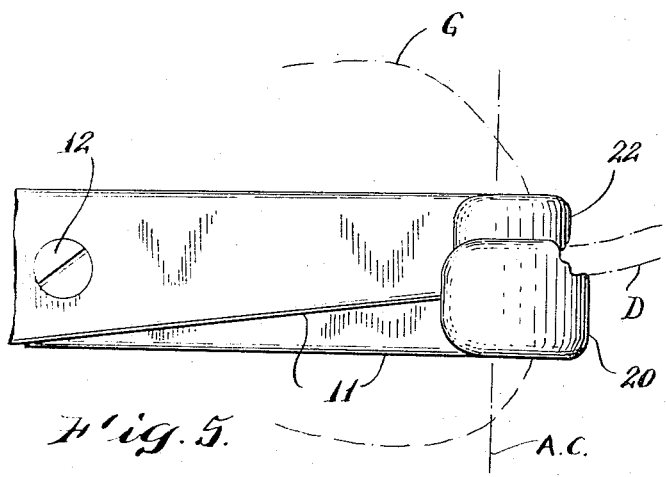
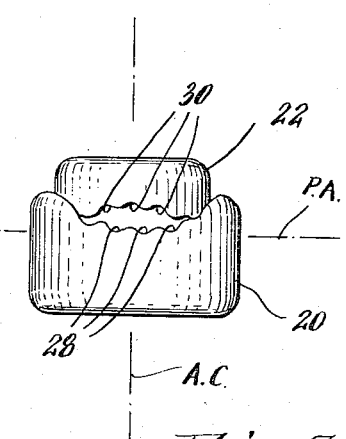
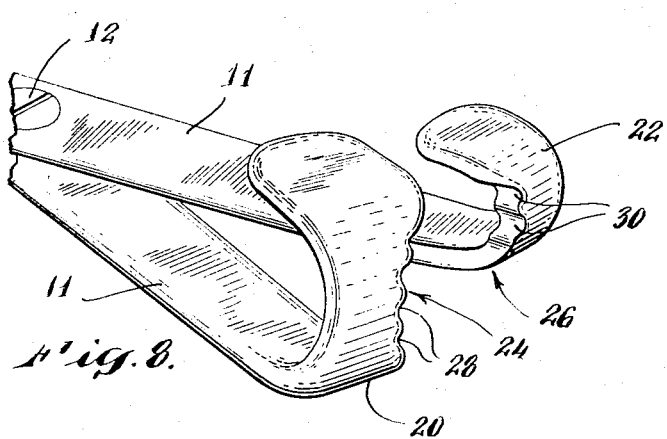

United States Patent Office 3,364,933
Patented Jan. 23, 1968

3,364,933
SLIDABLE SURGICAL CLAMP
Seymour Leopold, 26 Grassy Plain St.,
Danbury, Conn. 06810
Filed Mar. 29, 1965, Ser. No. 443,326
1 Claim. (Cl. 128—321)

ABSTRACT OF THE DISCLOSURE

A slidable surgical clamp having two arms joined together for relative axial movement in a pivoting plane, with reversely-curved gripping tips pivotable into overlapping, latchable juxtaposition and provided with smooth-surfaced, wavy facing edges having shallow axial grooves formed therein extending substantially parallel to the pivoting plane.

---

This application relates to surgical clamps for use in surgical operations performed upon human beings or animals, and particularly to latchable surgical clamps used to seize and grip small, supple tube-like ducts or tissues in a clamping position snugly adjacent to adjoining organs, glads or enlarged duct segments.

The surgical clamps of this invention are therefore useful in the spaying of female dogs and other animals and in the castration of male animals. In such operations one surgical clamp of this invention is latchably secured, closely cradling the animal's gland, and firmly clamping the duct, vascular tissue or ligaments connected to the gland, and a second surgical clamp is latched to grip these ducts or tissues nearby, beyond which they may be permanently tied off. The severing of the ducts or tissues between the two surgical clamps allows removal of the glad. Preferably, the clamps of this invention provide no severing or cutting action, but only crushing or clamping force.

Conventional surgical clamps are not suitable for use in seizing and gripping an elusive supple fine duct or connecting tissue close to the gland or organ which it joins, since they allow no axial "maneuvering" of the clamp and tissues by which the clamp may be moved snugly against the gland or organ while maintaining its grip on the tissues.

The surgical clamps of the present invention are uniquely shaped to facilitate such axial relative maneuvering of clamp and tissues, and to permit snug cradling of the gland against the clamp.

Other and more specific objects will be apparent from the features, elements, combinations and operating procedures disclosed in the following detailed description and shown in the drawings, in which:

FIGURE 1 is a top plan view of a surgical clamp of the present invention in its latched gripping position;

FIGURE 2 is a side elevation view of the clamp of FIGURE 1;

FIGURE 3 is a top plan view of the surgical clamp of FIGURE 1 moved to its unlatched open position;

FIGURES 4 and 5 are fragmentary enlarged views showing two successive positions of the clamping blades of the clamp of FIGURE 1; FIGURE 4 shows the clamping blades in their unlatched open position, while FIGURE 5 shows them closed in their latched gripping position;

FIGURES 6 and 7 are end elevation views of the portions of the clamp illustrated in FIGURES 4 and 5 respectively; and FIGURE 8 is a fragmentary perspective view of the clamping blades of the surgical clamp shown in FIGURE 1.

The surgical clamp of this invention shown in the drawings incorporates crossed elongated forcep arms 10 centrally joined by a pivot screw 12, and terminated by finger receiving rings 14. Near the rings 14 the respective arms 10 are provided with a latching hook 16 and a saw-tooth ratchet ear 18 cooperatively positioned for engagement of hook 16 with successive saw-teeth of the ratchet ear 18 as the arms 10 are successively pivoted closer together about pivot screw 12.

Beyond the pivot screw 12, the elongated arms 10 are each provided with clamping blades 11 respectively terminating in a reversely-curved outer jaw 20 and an overlapping, juxtaposed inner jaw 22.

As indicated in FIGURES 2 and 6, the clamping blades 11 of arms 10 may be said to swing in a pivoting plane P.P. perpendicular to the pivoting axis P.A. The arms 10 may be gently S-curved (FIGURE 2), with the finger-receiving rings 14 lying in a ring plane R.P. displaced by a distance $d$ from the pivoting plane P.P. This S-curvature of arms 10 facilitates exploratory probing and sliding maneuvering of the clamp, as described below.

As shown in the figures, the clamping blades 11, extending from the pivot screw 12 to terminate in the two clamping jaws 20 and 22, overlap each other in their closed position shown in FIGURES 1, 2, 5 and 7. The inner jaw 22 is curved back upon itself in a smooth C-shaped curve approximating a semi-circle, while the outer jaw 20 is also curved back upon itself around the inner jaw 22, so that the blades are in close peripheral proximity in their closed positions. The curvature of both jaws 20 and 22 is curvature about an axis of curvature substantially perpendicular to the pivoting axis P.A. of pivot screws 12 (FIGURES 1, 2), as well as to the longest dimension of elongated arms 10. In the closed gripping position of FIGURES 1, 5 and 7 the axes of curvature coincide in a single axis A.C.

It will be noted by comparing FIGURES 4 and 5, and FIGURES 6 and 7, that the generally semi-circular curved configurations of both outer jaw 20 and inner jaw 22 resemble "gore" segments of "ellipsoidal" shells, like segments of a pumpkin or a high-altitude balloon. Pivoting movement of these segments results in the generation of two overlapping, convex "surfaces of revolution" or ellipsoidal shells by the pivoting, swinging movement of the two arms 10 bringing the clamping jaws 20 and 22 toward each other. The reversely-curved shape of jaws 20 and 22 may be selected to coincide with the usual convex shape of a gland or organ G to be cradled in the jaws 20 and 22, as suggested in FIGURE 4.

The outer jaw 20 is provided with an outer clamping face 24 concavely formed in the edge or side of its semi-circular portion facing the semi-circular inner jaw 22 of the opposite arm 10. Inner jaw 22 is formed with a similar inner clamping face 26 concavely formed on its side or edge facing the outer clamping face 24. The clamping faces 24 and 26 correspond generally to the facing clamping surfaces of a pair of pliers, tongs, forceps or any other pivoted clamping instrument.

For stiffness and rigidity, the jaws 20 and 22 are elongated in a direction parallel to their axes of curvature, perpendicular to their clamping faces 24 and 26.

As best shown in FIGURES 6 and 7, the clamping faces 24 and 26 are preferably gently corrugated or scalloped in a wavy configuration forming longitudinal shallow grooves 28 and 30 respectively. The grooves 28 and 30 extend longitudinally in the direction of the arms 10, parallel to pivoting plane P.P. In the closed position of the clamping blades, in which the outer and inner jaws 20 and 22 are close together, as shown in FIGURES 5 and 7, it will be noted that the grooves 28 and 30 are all substantially parallel, permitting longitudinal sliding maneuvering of the closing clamp along the duct D.

Grooves 28 and 30 are thus uniquely adapted to permit clamping jaws 20 and 22 to be slidably maneuvered longitudinally while the duct D is being progressively clamped between the jaws. The increasingly parallel positioning of the grooves 28 and 30 with the progressive closing of the jaws 20 and 22, from the open position shown in FIGURE 4 to the closed position shown in FIGURE 5, provides longitudinal sliding support for the duct while facilitating the longitudinal sliding movement of the duct along grooves 28 and 30 between the approaching jaws 20 and 22.

These grooves 28 and 30 thus co-operate with the reversely-curved cradling jaws 20 and 22 to permit the clamp to be progressively closed upon duct D while it is cradling gland G and being maneuvered toward the junction of the duct D with the gland G. The jaws 20 and 22 are locked in their clamped position (FIGURES 5 and 7) by engagement of hook 16 with successive sawtooth notches in ratchet ear 18 (FIGURE 1).

The surgical clamps of this invention thus provide snug cradling of the gland with secure gripping and latched clamping of the duct D near its junction with the cradled gland G. This operation of these surgical clamps is thus uniquely well adapted for use in the surgical operations described above.

While the objects of the invention are efficiently achieved by the preferred forms of the invention described in the foregoing specification, the invention also includes changes and variations falling within and between the definitions of the following claim.

I claim:
1. A surgical clamp comprising in combination
(A) a first elongated arm having a finger-receiving ring and a latching hook at one end,
(B) a second elongated arm having a finger-receiving ring and a latching rachet ear at one end,
(C) the opposite ends of both arms being formed as overlappable clamping jaws,
(D) means pivotally joining the arms near their clamping jaw ends for pivoting relative movement of the clamping jaws in a pivoting plane with the latching hook being aligned for latching engagement with the rachet ear,
(E) and with the clamping jaws having smoothly rounded overlappable gripping tips with facing edges formed as curved facing concave recesses having undulated grooves formed in their facing surfaces extending substantially parallel to the pivoting plane.

References Cited

UNITED STATES PATENTS 1,053,149  2/1913  Blunk _____ 128—322

OTHER REFERENCES

KNY Scheerer Co. catalog, 20th edition, copyright 1915, pp. 2016–7 and 2036 relied upon.

LOUIS G. MANCENE, *Primary Examiner.*

RICHARD A. GAUDET, *Examiner.*

G. E. McNEILL, *Assistant Examiner.*